Figure 1:
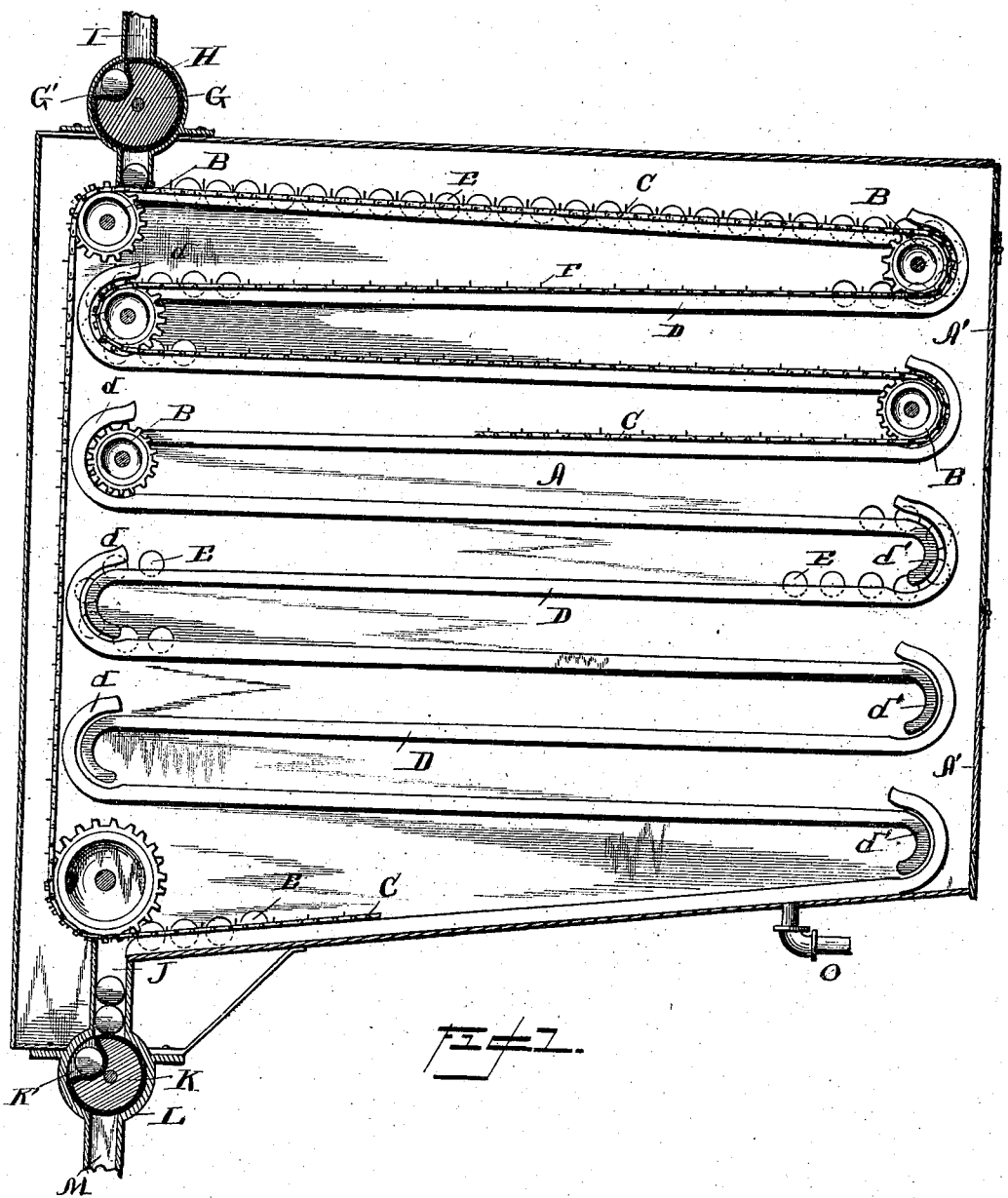

(No Model.) 2 Sheets—Sheet 1.

F. B. MERRILL & G. H. LOVELL.
MEANS FOR COOKING CANNED GOODS.

No. 498,358. Patented May 30, 1893.

WITNESSES

INVENTORS
Ferdinand B. Merrill
and George H. Lovell,
by W. H. Babcock
Attorney (No Model.) 2 Sheets—Sheet 2.
F. B. MERRILL & G. H. LOVELL.
MEANS FOR COOKING CANNED GOODS.
No. 498,358. Patented May 30, 1893.
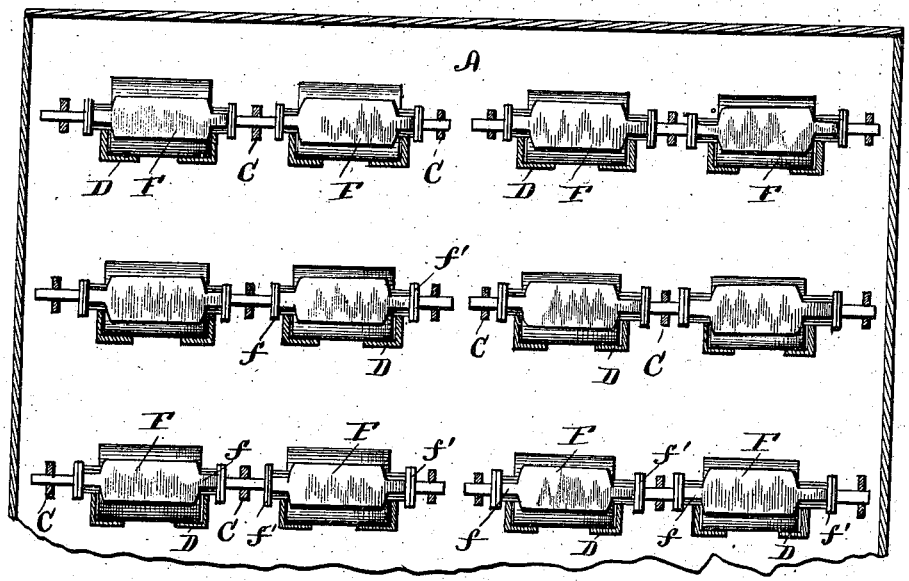
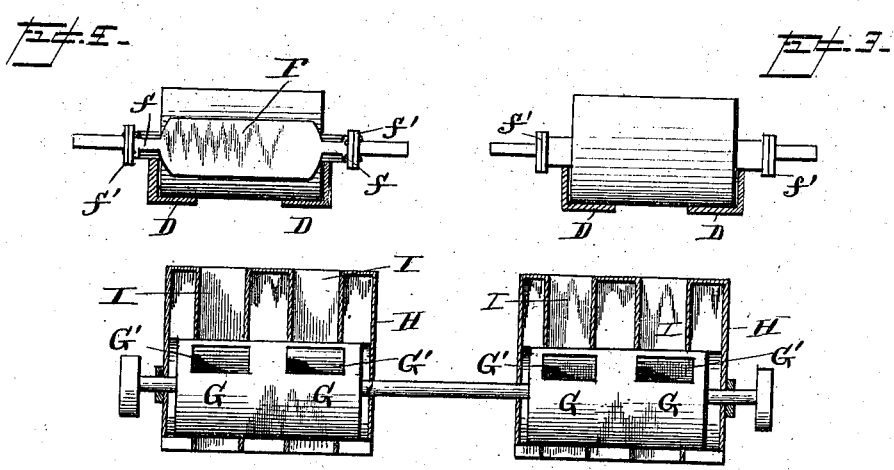
WITNESSES
INVENTORS
Ferdinand B. Merrill
George H. Lovell
by Wm H Babcock
Attorney

UNITED STATES PATENT OFFICE.

FERDINAND B. MERRILL AND GEORGE H. LOVELL, OF YARMOUTH, MAINE.

MEANS FOR COOKING CANNED GOODS.

SPECIFICATION forming part of Letters Patent No. 498,358, dated May 30, 1893.

Application filed October 8, 1892. Serial No. 448,227. (No model.)

*To all whom it may concern:*

Be it known that we, FERDINAND B. MERRILL and GEORGE H. LOVELL, citizens of the United States, residing at Yarmouth, in the county of Cumberland and State of Maine, have invented certain new and useful Improvements in Means for Cooking Canned Goods; and we do hereby declare the following to be a full, clear, and exact description of the invention, such as will enable others skilled in the art to which it appertains to make and use the same.

The object of this invention is to improve the cooking of canned goods and especially corn in cans.

Heretofore the cans containing corn or other articles of food have generally been subjected to the steam heat or other means of cookery while supported in trays or by other means maintaining a constant position. As a consequence the contents are more or less imperfectly and unequally heated, the cooking being greatest near the tin of the can and least at the center. No regular and thoroughly efficient stirring action has been employed. By our invention every grain or other particle is equally and thoroughly cooked, since each in turn is exposed to the greatest calorific action by a thorough reversing and shaking motion which mixes the entire contents together in the most effective manner, the said invention consisting in devices for causing the cans and all that is within them to turn while undergoing cookery, they being carried bodily around through a steam chest or other cooker and being preferably given independent axial rotation also. To effect this we make use of various constructions and combinations of mechanism, one very efficient form of which is shown in the accompanying drawings.

In the drawings Figure 1 represents a vertical section through a cooker embodying our invention. Fig. 2 represents a horizontal section on the line $x$—$x$ of Fig. 1. Fig. 3 represents a detail view of one of the cans in position, the angle-iron links being shown in cross-section. Fig. 4 represents a similar view, showing one of the flights in front of the can and Fig. 5 represents a detail view of the inlet feeding rollers.

A designates the casing of the cooker, provided with convenient doors A' which are steam tight, like all other parts of the structure.

B designates several parallel series of sprocket-wheels journaled within the said cooker to the walls thereof and driven by any suitable power and gearing, not shown. An endless chain C passes around and over each series of these sprocket wheels, as shown in Fig. 1, following the bottom, the top, and one of the walls of the said cooker and passing back and forth in a zigzag path in the intervening space.

D designates guide-ways for the cans consisting of angle-irons arranged in pairs, each pair serving for one line of cans E. The chains likewise are arranged in pairs alternating with the cans.

The opposite links of each pair of chains are connected by flights F at such intervals as to leave space for the individual cans. The stems $f$ of these flights extend beyond the angle-irons and are provided with collars or stops $f'$ to make them keep their relative position, these latter parts extending down outside the said angle-irons. The ends of the angle-bars curve up, as shown, at their upper ends $d$ and down at their lower ends $d'$, overlapping to complete the guideway. The chain is broken away from a part of Fig. 1 to make this construction plainer.

The cans are fed to the chains and guideways by rollers G, one to each two pairs of chains turning in a steam-tight casing H which receives them through inlet tubes I corresponding in number and arrangement to the pairs of guideways and chains, the said casing opening below into the interior of the cooker. The feed roller G has a pair of pockets G' arranged respectively under the said inlet tubes. With each rotation of the said roller one of the cans drops from each pocket on one of the upper guideways and is carried along in the zigzag path stated by the flight next behind which of course travels with its chain. While it is so doing the friction of the guide-way will of course tend to turn all the cans on their axes; and in addition as they pass around in the curved parts $d$ $d'$ of the guideway they are necessarily completely turned, so as to invert and stir up their contents. Indeed during this zigzag travel the said contents will be turned, shaken up and stirred many times and the heat to which it is subjected will have equal effect on every part. The bottom of the said cooker is inclined and the lower guide ways and chains follow the same inclination facilitating the outward passage of the cans of cooked corn. This takes place at points directly under the inlets as shown; though such arrangement is not indispensable. The cans drop one by one into outlets J similar to outlets I and thus reach pockets K' in one of the outlet feeding-rollers K similar to rollers G, and each turning in a casing L which is the counterpart of casing H. From the lower part of this casing discharge tubes M allow the cans one by one to fall into any convenient receptacle. Instead of this endless chain construction, we may employ a series of cylinders carrying the cans around with them or any other suitable known means for effecting the rotation and stirring of the contents. But the chains and guideways are more satisfactory insuring the rotation due to friction as well as that due to the line of travel.

Steam is admitted to the interior of the cooker through an inlet pipe O, arranged preferably at the bottom thereof; and acts directly on the cans. Of course hot air may be employed instead; or any other known heating agent inside or outside of the said cooker.

The guideways may be fastened to a removable frame instead of being fastened directly to the wall of the cooker as described.

Having thus described our invention, what we claim as new, and desire to secure by Letters Patent, is—

1. In combination with means for supporting on their sides, cans containing food, a traveling chain arranged to propel the said cans forward, thereby causing their rotation, and devices for applying heat to the said cans to cook their contents while thus rotated substantially as set forth.

2. In combination with means for supporting cans containing food, an endless chain arranged to propel the cans in a path turning on itself so as to cause their rotation and devices for applying heat to the said cans to cook their contents while they are thus rotating substantially as set forth.

3. In combination with means for rotating cans containing food, and heating devices acting on them to cook the contents while thus rotated, automatic feeding mechanism for supplying cans thereto and removing them therefrom substantially as set forth.

4. Guideways consisting of angle bars arranged in pairs with overlapping curved ends $d\ d'$, in combination with endless chains and flights connecting the same at intervals to leave space for the individual cans which they engage to move forward and means for driving the chains and applying heat substantially as set forth.

5. In combination with guideways and chains arranged to carry the cans in a zigzag path, turning upon itself to rotate them, a cooker which incloses and supports the said devices, substantially as set forth.

6. A cooker for canned goods provided with an inlet and an outlet in combination with devices controlling them and mechanism within the said cooker for carrying the cans containing corn or any other suitable material from the said inlet to the said outlet and causing them to rotate on the way.

7. A feeding roller provided with a pocket or pockets, each receiving one can at a time in combination with a casing in which it turns, mechanism arranged below it for receiving carrying and rotating the said cans as they are dropped one by one and a cooker to which the said parts are attached substantially as set forth.

8. In combination with a cooker having an inlet and an outlet, a roller arranged in each and provided with pockets for receiving and discharging the cans individually substantially as set forth.

In testimony whereof we affix our signatures in presence of two witnesses.

FERDINAND B. MERRILL.
GEORGE H. LOVELL.

Witnesses:
LEON R. COOK,
FRANK W. BUCKNAM.